United States Patent
Cline et al.

(10) Patent No.: US 6,745,350 B1
(45) Date of Patent: ***Jun. 1, 2004

(54) AUTOMATED FAILURE RECOVERY SERVICE

(75) Inventors: Owen R. Cline, Poway, CA (US); Craig J. Hubbell, Temecula, CA (US); Vinodkumar M. Jessani, San Diego, CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1393 days.

(21) Appl. No.: 08/778,459

(22) Filed: Jan. 3, 1997

(51) Int. Cl.[7] ................................................ G06F 11/00
(52) U.S. Cl. ........................................... 714/49; 714/38
(58) Field of Search ................................ 395/180, 181, 395/182.02, 182.13, 182.14, 182.18, 600, 650, 700; 714/2, 7, 20, 25, 31, 39, 49, 50, 47, 37, 38

(56) References Cited

U.S. PATENT DOCUMENTS

| | | | | |
|---|---|---|---|---|
| 5,023,873 A | * | 6/1991 | Stevenson et al. | |
| 5,410,684 A | * | 4/1995 | Ainsworth et al. | 395/182.02 |
| 5,613,060 A | * | 3/1997 | Britton et al. | 395/182.13 |
| 5,715,386 A | * | 2/1998 | Fulton, III et al. | 395/183.14 |

* cited by examiner

*Primary Examiner*—Nadeem Iqbal
(74) *Attorney, Agent, or Firm*—Gates & Cooper LLP

(57) ABSTRACT

A method, apparatus, and article of manufacture for failure recovery in a computer network. The invention provides a system monitor that allows a process to register itself for monitoring and dictate a failure recovery mechanism if the process terminates abnormally. The system monitor according to the present invention continuously monitors the process and detects when the process abnormally terminates. A failure recovery mechanism is then executed. The failure recovery mechanism includes the execution of an executable, a command line script or the starting of a service. These actions allow virtually any failure recovery scenario such as re-starting the failed process, cleaning up after the failed process, notifying other processes of the failure, or sending a notification of the failure.

39 Claims, 3 Drawing Sheets

AUTOMATED FAILURE RECOVERY
SERVICE

CROSS-REFERENCE TO RELATED
APPLICATIONS

This application is related to application Ser. No. 08/775,979, entitled "AUTOMATED MESSAGE QUEUE SERVICE," filed on same date herewith, by Owen R. Cline et al., which application is incorporated by reference herein.

BACKGROUND OF THE INVENTION

1. Field of the Invention

This invention relates in general to computer networks, and in particular to managing computer networks.

2. Description of Related Art

In distributed computing environments comprising interconnected mainframes, minicomputers, servers and workstations, when processes abnormally terminate, there is no way currently to detect this and then initiate an automatic failure recovery mechanism. There is a need in the art for an efficient mechanism for monitoring processes and executing a failure recovery scenario in response to the state of the process.

SUMMARY OF THE INVENTION

The present invention discloses a method, apparatus, and article of manufacture for failure recovery in a computer network. The invention provides a system monitor that allows a process to register itself for monitoring and dictate a failure recovery mechanism if the process terminates abnormally. The system monitor according to the present invention continuously monitors the process and detects when the process abnormally terminates. A failure recovery mechanism is then executed.

The failure recovery mechanism can include the execution of an executable, a command line script or the starting of an operating system service. These actions allow virtually any failure recovery scenario such as re-starting the failed process, cleaning up after the failed process, notifying other processes of the failure, or sending a notification of the failure.

An application programming interface performed by the computer manages the system monitor of this invention to perform the monitoring and failure recovery functions.

BRIEF DESCRIPTION OF THE DRAWINGS

Referring now to the drawings in which like reference numbers represent corresponding parts throughout.

DETAILED DESCRIPTION OF THE
PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may-be made without departing from the scope of-the present invention.

Overview

Figure 1:
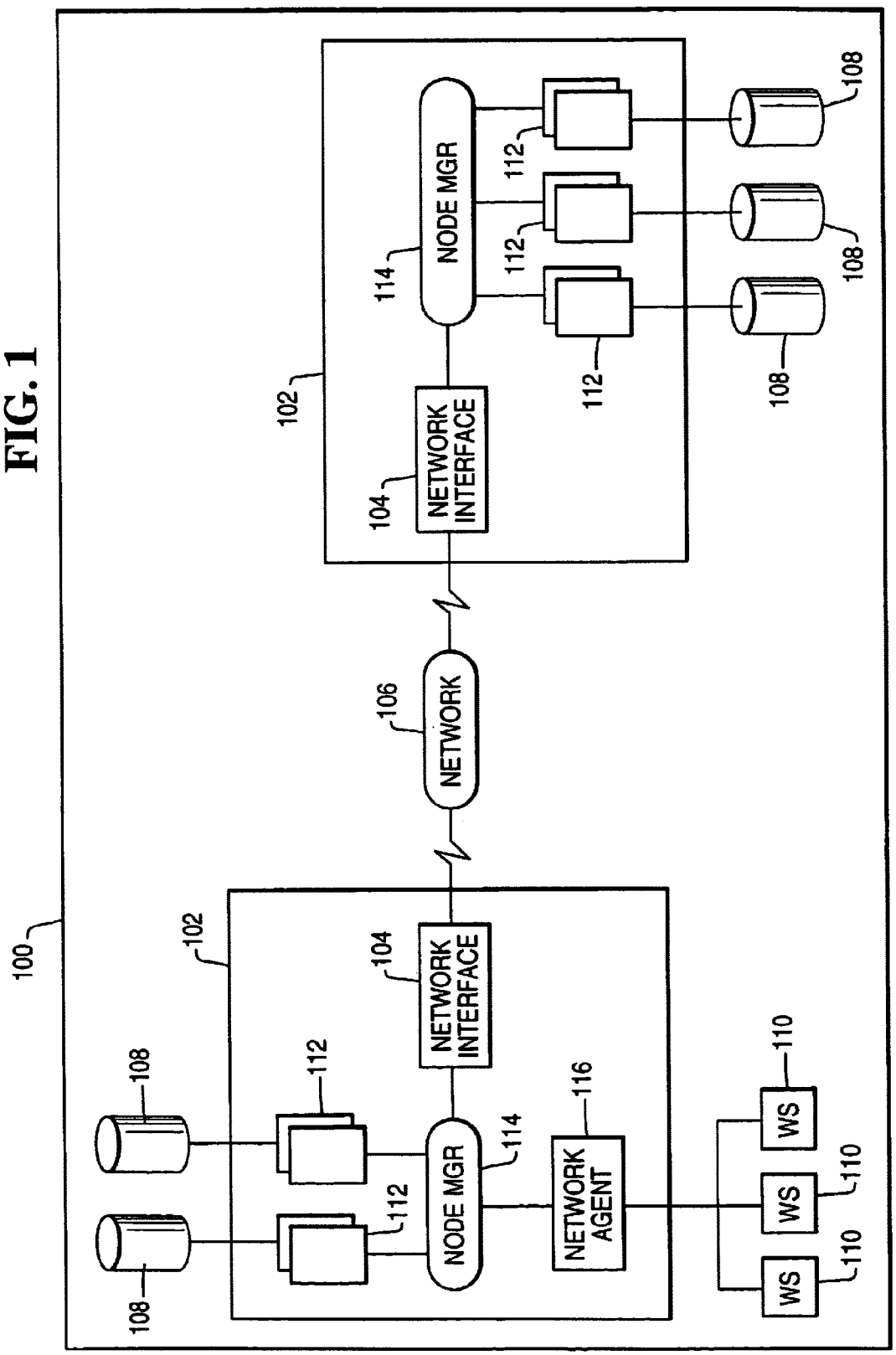
FIG. 1 is an exemplary illustration of a distributed computing environment known as a TOP END™ system.

FIG. 1 is an exemplary illustration of a distributed computing environment 100, known as a TOP END™ system. The present invention comprises a method, apparatus, and article of manufacture for interprocess communications in such distributed computing environments.

A TOP END™ system 100 is comprised of one or more nodes 102 interconnected through a network interface 104 by a network 106, wherein each of the nodes 102 is comprised of one or more computers. Each of the nodes 102 is typically coupled to one or more fixed and/or removable data storage units (DSUs) 108, such as disk drives, that store one or more databases.

In the exemplary environment of FIG. 1, a client-server architecture is disclosed. At least one of the nodes 102 provide the connection to client systems operating on workstations 110. Operators of the TOP END™ system 100 use a workstation 110 or terminal to transmit electrical signals to and from server systems operating on the node 102 in the TOP END™ system 100, wherein the electrical signals represent commands for performing various functions in the TOP END™ system 100, such as search and retrieval functions against the databases. Those skilled in the art will recognize, however, that the present invention has application to any function or software that can be performed by a TOP END™ system 100.

According to the present invention, these functions are divided into several modular components 112 that are designed for a distributed, message-passing computing environment. In TOP END™ terminology, a "component" 112 is a process or logical group of processes that performs one or more functions. The components 112 work together to process distributed transactions initiated by the client systems.

Work is divided among the nodes 102 in the TOP END™ system 100 by spreading the location of these modular components across the nodes 102. Thus, each node 102 performs some localized function and work is managed by the system 100 so that a sequence of multiple functions comprising a client request is performed by one or more of the modular components on one or more of the nodes 102 in the system 100.

The fundamental component 112 in a TOP END™ system 100 is the application component 112. Application components 112 are used to create and grow distributed TOP END™ systems 100. The application components 112 could be user-written, provided as a solution by an independent vendor, or supplied as part of the TOP END™ system 100. In a TOP END™ system 100, a comprehensive set of services and libraries are available to an application component 112, including resource managers such as database management systems (DBMS), transaction managers, and communications managers.

Another component of a TOP END™ system 100 is the node manager 114. The node manager 114 is a collection of processes that offer core services to coordinate processing among nodes 102. These processes, in general, work independently of each other. Services provided by the node manager 114 include transaction management (for example, commit coordination), logging, failure recovery, client/server request handling, security management, runtime administration, and application component 112 control.

Still another component of a TOP END™ system 100 is the network agents 116. Network agents 116 are used to allow transactions and service requests to enter a TOP END™ system 100 from an application component 112 or networked workstation 110 that does not have a node manager 114 on it.

The TOP END™ system 100 also provides myriad tools for managing the distributed computing environment. More specifically, a TOP END™ system 100 provides a full range of graphical, menu-based administrative tools that make it easy to manage distributed computing environments. The systems administration tools are used to perform component start-up and shutdown, manage auditing and recovery, activate communication links, perform automatic software distribution, and so on.

Figure 2:
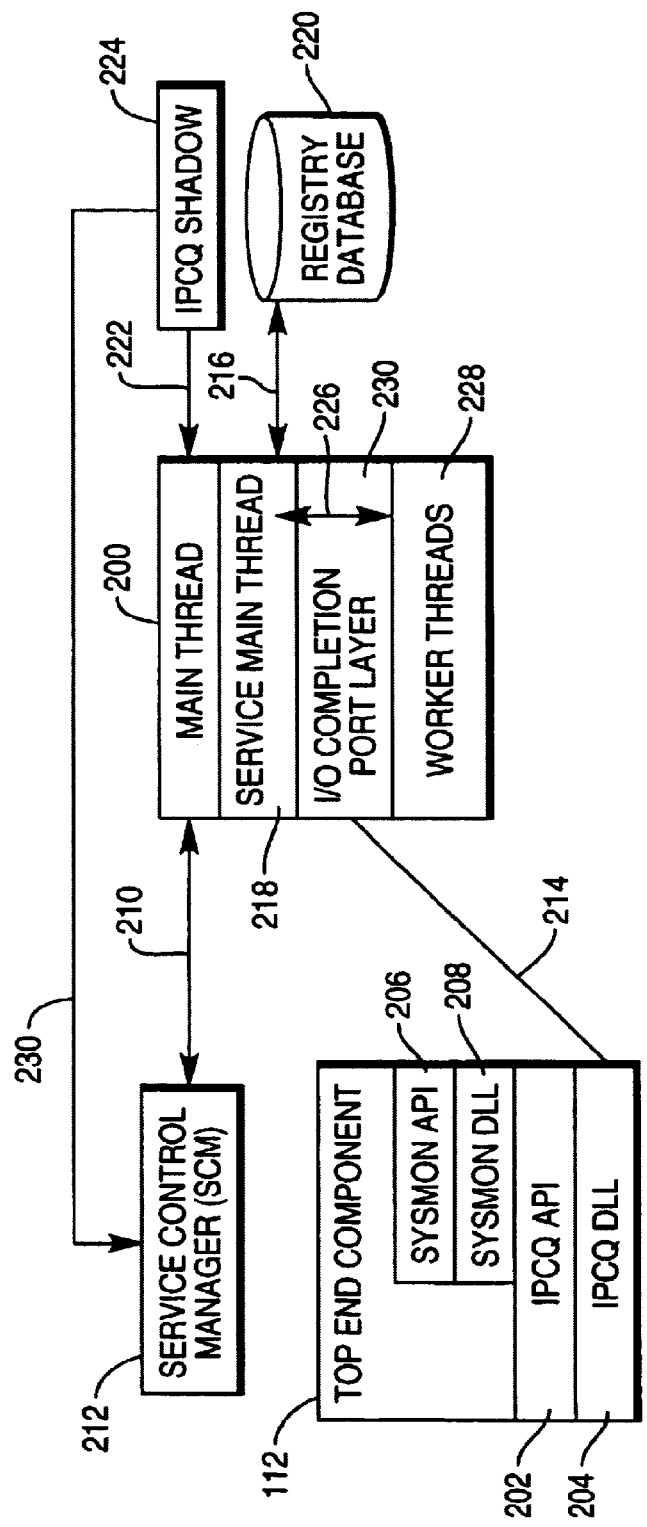
FIG. 2 is a block diagram illustrating the interprocess communications queue and system monitor service according to the present invention.

FIG. 2 is a block diagram illustrating the interprocess communications queue system monitor (IPCQ/Sysmon) Service 200 according to the present invention. The IPCQ Application Programming Interface (API) 202, IPCQ Dynamic Link Library (DLL) 204, Sysmon API 206 and the Sysmon DLL 208 are oriented in a TOP END™ component 112. All communications to the IPCQ/Sysmon Service 200 must pass through the IPCQ DLL 204. A TOP END™ component 112 can code directly to the IPCQ DLL 204 via the IPCQ API 202. Calls to the Sysmon DLL 208 always pass through the IPCQ DLL 204 since the IPCQ/Sysmon Service 200 incorporates all of the Sysmon functionality.

There are several distinct inter-process communications paths which the IPCQ/Sysmon Service 200 must manage. Link 210 between the Service Control Manager (SCM) 212 and IPCQ/Sysmon Service 200 is actually standard for the operating system service. An exemplary operating system according to the present invention is Windows NT, but those skilled in the art will recognize that other operating systems will work as well. The SCM 212 is the user interface provided by the operating system to start, stop, pause, continue or interrogate a service. In the exemplary embodiment disclosed herein, the IPCQ/Sysmon Service 200 will support all SCM 212 commands except pause and continue. IPCQ/Sysmon Service Main Thread 218 directs the initialization and deinitialization of the IPCQ/Sysmon Service 200.

Link 214 between a TOP END™ component 112 and the IPCQ/Sysmon Service 200 is used to pass all messages. Link 214 is via a named pipe. The component 112 will initiate a connection by the IPCQ DLL 204 to a well-known named pipe. Besides the named pipe connection, link 214 also involves separate semaphores for every message queue that the component 112 opens. The IPCQ/Sysmon Service 200 will increment the appropriate semaphore count every time a message is enqueued. The TOP END™ component 112 can then be notified asynchronously (via the semaphore handle) when new messages are available. Additionally, link 214 will function on a per-thread basis. A multi-threaded TOP END™ component 112 will establish separate connections to the IPCQ/Sysmon Service 200 from multiple threads which use the IPCQ DLL 204. Link 214 will not be restricted to local connections. Remote connections, including. Remote Access Services (RAS) connections, will be supported.

Link 216 between the IPCQ/Sysmon Service Main Thread 218 and the operating system Registry Database 220 receives asynchronous notification when Registry Database 220 data is updated which affects the IPCQ/Sysmon Service's 200 level of debug support, its configuration parameters or changes in the list of TOP END™ systems. If any of these change, the IPCQ/Sysmon Service 200 will re-read the Registry Database 220 and dynamically alter itself.

Link 222 between the IPCQ/Sysmon Service 200 and the IPCQ Shadow 224 is a named pipe which allows the IPCQ/Sysmon Service 200 to send packets to the IPCQ Shadow 224 when components 112 create queues and when the IPCQ/Sysmon Service 200 shuts down normally. It allows the IPCQ Shadow 224 to detect when the IPCQ/Sysmon Service 200 terminates abnormally. If the IPCQ/Sysmon Service 200 terminates, the IPCQ Shadow 224 will initiate a limited restart sequence. Additionally, the IPCQ/Sysmon Service 200 will monitor the process handle of IPCQ Shadow 224. If the handle is signaled, the IPCQ/Sysmon Service 200 will restart the IPCQ Shadow 224.

Link 226 between the IPCQ/Sysmon Service Main Thread 218 and the Worker Threads 228 through the I/O Completion port layer 230, which is not a separate thread, illustrates that the Service Main Thread 218 and all of the Worker Threads 228 will communicate together. They will do this using events and global data structures protected with critical sections.

Link 232 between the IPCQ Shadow 224 and the SCM 212 illustrates that the IPCQ Shadow 224 will instruct the SCM 212 to start the IPCQ/Sysmon Service 200 during its restart sequence.

The IPCQ/Sysmon Service 200 has one or more object programs that are linked or bound to one or more object libraries comprising the IPCQ (API) 202 and the Sysmon API 206. The IPCQ API 202 and the Sysmon API 206 provide the functions necessary for the desired IPCQSysmon Service 200. The IPCQSysmon Service 200 and the IPCQ API 202 and Sysmon API 206 are executed by a computer under the control of an operating system, such as Windows NT™, UNIX™, etc. The computer may be a workstation 110 or a node 102 connected to the network 106.

Generally, the IPCQSysmon Service 200 and the IPCQ API 202 and Sysmon API 206 are all tangibly embodied in a computer-readable medium, e.g., one or more of the fixed and/or removable data storage devices 108 coupled to the computer 102 or 110. Moreover, the IPCQSysmon Service 200 and the IPCQ Service API 202 and Sysmon API 206 are both comprised of instructions which, when read and executed by the computer 102 or 110, causes the computer 102 or 110 to perform the steps necessary to implement and/or use the present invention. Under control of the operating system, the IPCQSysmon Service 200 and the IPCQ Service API 202 and Sysmon API 206 may be loaded from the data storage devices 108 into the memory of the computer 102 or 110 for use during actual operations.

IPCQ Service

Figure 3:
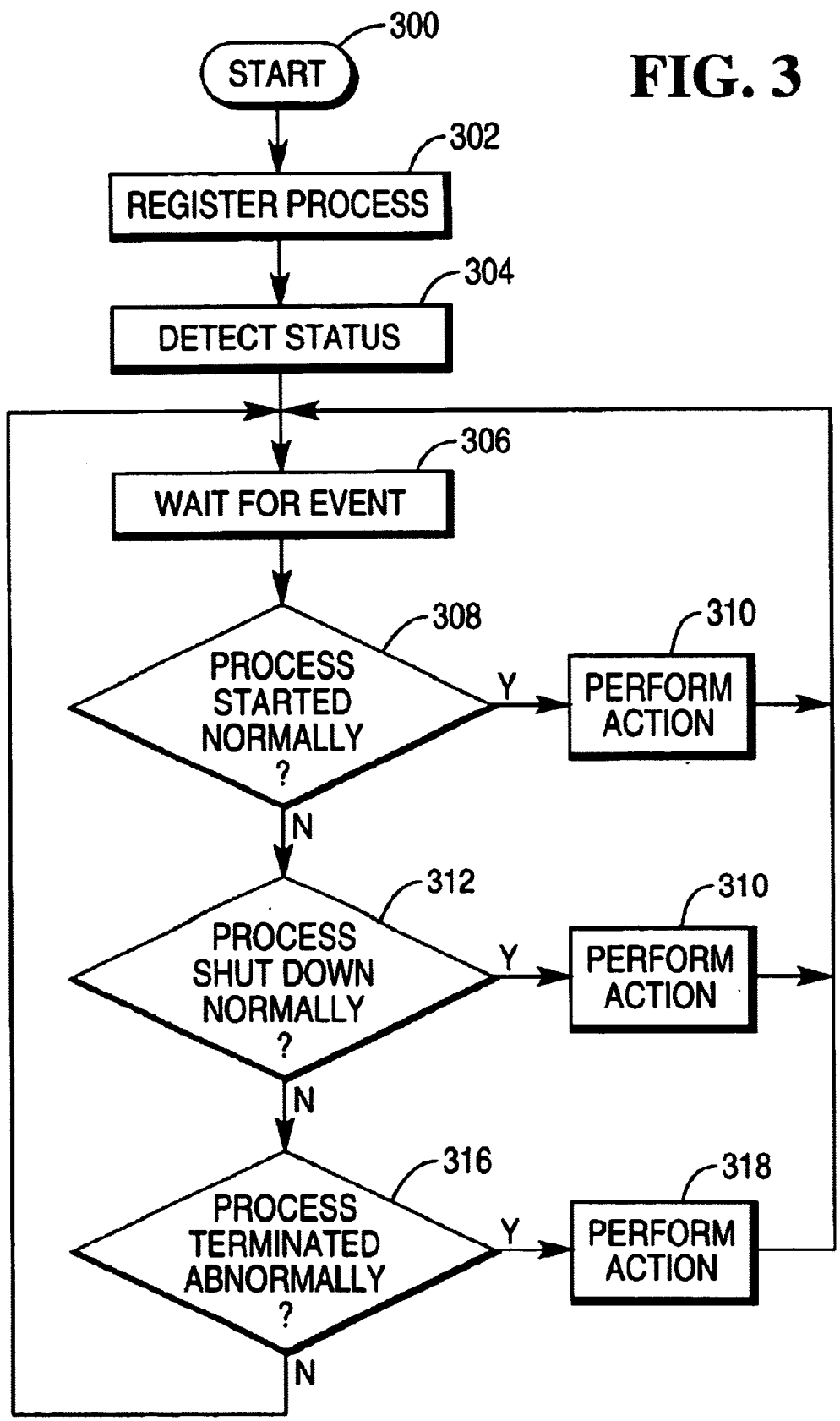
FIG. 3 is a block diagram illustrating the steps performed by the system monitor service according to the present invention.

FIG. 3 is a block diagram illustrating the steps performed by the IPCQ/Sysmon Service 200 according to the present invention.

Block 300 represents the start of the IPCQ/Sysmon Service 200.

Block 302 represents a TOP END™ component 112 registering a process with the IPCQ/Sysmon Service 200.

Block 304 represents the IPCQ/Sysmon Service 200 detecting the status of the registered process.

Block 306 represents the IPCQ/Sysmon Service 200 waiting for a change in status of the registered process.

Block 308 represents the process starting normally.

Block 310 represents the IPCQ/Sysmon Service 200 performing an action in response to the process starting normally.

Block 312 represents the process shutting down normally.

Block 314 represents the IPCQ/Sysmon Service 200 performing an action in response to the process shutting down normally.

Block 316 represents the process terminating abnormally.

Block 318 represents the IPCQ/Sysmon Service 200 performing an action in response to the process terminating abnormally.

The actions performed by the IPCQ/Sysmon Service 200 represented by blocks 310, 314, and 318 in response to the state changes include running another process, starting a Windows NT™ service, sending an e-mail, sending a fax, sending an alphanumeric page or sending a TOP END™ Global Alert.

Figure 4:
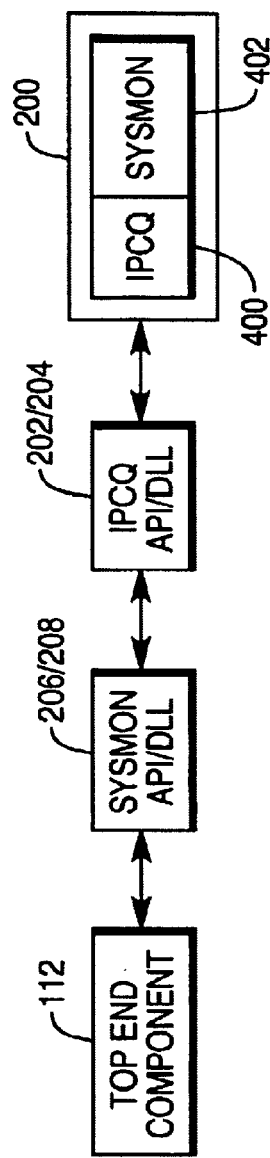
FIG. 4 is a block diagram illustrating the process flow of the system monitor service according to the present invention.

FIG. 4 is a block diagram illustrating the process flow of the system monitoring service. A system monitor message is delivered to the IPCQ/Sysmon Service 200 from a TOP END™ component 112 through the IPCQ DLL 204 by calling Sysmon API 206 in Sysmon DLL 208. The IPCQ/Sysmon Service 200 includes the IPCQ Service 400 and the Sysmon Service 402. The receiving Worker Thread 228 in the IPCQ/Sysmon Service 200 will call a Sysmon API 206 function SYSMON_PROCESSMESSAGE to process the System Monitor message. The SYSMON_CLOSE API is called when the IPCQ Service 200 detects that a connection is closed. The SYSMON_CLOSE API ignores all the calls unless the connection lost is the last one for the process. Every TOP END™ component 112 which is monitored by the Sysmon Service 402 is represented by a node in a linked list.

When a TOP END™ component 112 dies, this event will be detected by the closing of the named pipe connection. A Worker Thread 228 will be able to determine the process ID and the thread ID of the dead thread. A connected components table maintains a list of active named pipe instances and to which component they are connected with. If there are no entries in the connected components table for the process ID, the Worker Thread 228 will assume that all of the TOP END™ component 112 threads have exited. It will then initiate all Sysmon actions logged for this component.

Internal APIs

The following describe the internal APIs in the Sysmon Service 402 that will be implemented to serve the interactions among IPCQ Service 400 and Sysmon Service 402 in the IPCQ/Sysmon Service 200.

The EXECUTEACTION function executes an action. If a program or command file is to be spawned, this function logs into the user account reserved for the TOP END™ system 100 to which the creator of the action belonged. Otherwise, the program or command file would run with the full permissions of the IPCQ Service 400.

To reduce the number of process creations when components 112 exit, the EXECUTEACTION function determines if it is about to spawn a utility called ADM_MON. ADM_MON is spawned whenever a component 112 starts or stops. It logs a message in the message queue for TP_ADMIN. Instead of spawning ADM_MON, the EXECUTEACTION function logs a message directly into the appropriate message queue.

The SM_ACTION_NT_SERVICE function starts an operating system service, such as a Windows NT™ service. One command line argument may be specified which will be passed to the service being started. The component must pass a string containing the service to start and the command line parameter separated by a comma.

The SYSMON_INIT function is used by the IPCQ/Sysmon Service Main Thread 218 at start up time to initialize the Sysmon Service 402. The initialization process includes initialization of the critical section which will be used in the SYSMON_PROCESSMESSAGE function to allow only one thread of execution to enter the function at one time.

The DEINIT function is used by the IPCQ/Sysmon Service Main Thread 218 at shutdown time to de-initialize the Sysmon Service 402. The de-initialization process includes de-initialization of the critical section previously initialized in the SYSMON_INIT.

The PROCESSMESSAGE function is used by the IPCQ Service 400 to pass a Sysmon message for processing. In this function, a thread of execution enters a critical section, calls the Sysmon PROCESSMESSAGE and RETURNMESSAGE functions, and leaves the critical section.

The CLOSE function is used by the IPCQ Service 400 when the closing of a connection to a component 206 is detected.

The PUTRESPONSE function is provided by the IPCQ Service 400 code to be used by the Sysmon Service 402 to pass a Sysmon return message to IPCQ Service 400 which in turn will be sent to the Sysmon DLL 208.

The ISVALIDSYSTEM function is provided by the IPCQ Service 400 code to be used by the Sysmon Service 402 to check if a system is a valid one.

Sysmon Application Programming Interface

The Sysmon API 206 provides the necessary procedures for the IPCQ/Sysmon Service 200 to provide system monitoring functions in the TOP END™ systems 100, nodes 102, and components 112.

The following describe some the procedures of the Sysmon API 206 invoked by the IPCQ/Sysmon Service 200:

The SYSMON_ACTION function requests action on the state change of monitored process. The SYSMON_ACTION function submits an event/action pair to the sysmon service. When the event occurs, the corresponding action will be executed by the IPCQ/Sysmon Service 200. The possible actions are: SM_ACTION_SIGNAL_PG sends a signal to the process group of the monitored process. SM_ACTION_SIGNAL_UID sends a signal to all processes with the user ID (UID) as the UID of the monitored process. SM_ACTION_EXEC executes a filename in the current working directory of the requester under the requester's user ID. SM_ACTION_PIPE writes to a filename (named pipe) the same parameters passed to the executed filename. The written parameters are passed as a character string <n>terminated.

The events specify when to trigger an action. Possible events are: SM_EVENT_SIGNON occurs when the monitored process calls SYSMON_SIGNON. SM_EVENT_SIGNOFF occurs when the monitored process calls SYSMON_SIGNOFF. SM_EVENT_ABNRML_SIGNOFF occurs when the monitored press_calls SYSMON_SIGNOFF with any non-zero why value. SM_EVENT_EXIT occurs when the monitored process exits. SM_EVENT_ABNRML_EXIT occurs with the monitored process exits without calling SYSMON_SIGNOFF. SM_USER_EVENT_1 is specified in SYSMON_USER_EVENT.

The SYSMON_CAUSE_EVENT function causes a user specified event to occur. If a corresponding action has been defined, the action will be executed. The caller may also change the info string. The change to the info string is made before the action is executed. The SYSMON_CAUSE_EVENT function may also be used to change the info string without causing an event to occur.

The SYSMON_DEBUG function requests the debug level for the sysmon service.

The SYSMON_FORGET function deletes all SYSMON_ACTION function requests which match the criteria specified in the parameters.

The SYSMON_LIST function lists monitored processes. Each call to SYSMON_LIST returns the sysmonid and info strings for each monitored process whose identifier matches the sysmon_id parameter.

The SYSMON_SIGNOFF function causes the sysmon service to stop monitoring the given process. If an EVENT_SIGNOFF action has been requested for the given sysmon_id, the action will be executed by the sysmon service. If a why parameter is non-zero, SM_EVENT_ABNRML_SIGNOFF actions will also be executed.

The SYSMON_SIGNON function causes the calling process to be monitored by the sysmon service. If an EVENT_SIGNON action has been requested for the given sysmon_id, the action will be executed by the sysmon service.

Conclusion

In summary, the present invention discloses a method, apparatus, and article of manufacture for failure recovery in a computer network. The invention provides a system monitor to allow a process to register itself for monitoring and dictate a failure recovery mechanism if the process terminates abnormally. The system monitor according to the present invention continuously monitors the process and detects when the process abnormally terminates. A failure recovery mechanism is then executed.

The failure recovery mechanism includes the execution of an executable, a command line script or the starting of a service. These actions allow virtually any failure recovery scenario such as re-starting the failed process, cleaning up after the failed process, notifying other processes of the failure, or sending a notification of the of the failure.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for failure recovery, comprising a system monitor, executed by a computer, for registering at least one component executed by a computer for failure recovery services performed by the system monitor, wherein the system monitor monitors the registered component via a connection between the registered component and the system monitor, and the system monitor performs the failure recovery services when the registered component's termination is detected by a closing of the connection.

2. The apparatus of claims 1, wherein the system monitor and registered component are connected on a per-thread basis.

3. The apparatus of claim 2, wherein the registered component is multi-threaded, and establishes a separate connection to the system monitor from each of its multiple threads.

4. The apparatus of claim 3, wherein the system monitor performs the failure recovery services when a last one of the separate connections with the registered component is closed.

5. The apparatus of claim 1, wherein the connection is selected from a group comprising local connections and remote connections.

6. The apparatus of claim 1, wherein there exists an inter-process communications path between a Service Control Manager (SCM) and the system monitor, and the SCM provides a user interface used to start, stop, and interrogate the system monitor.

7. The apparatus of claim 1, wherein the system monitor includes a link to a Registry Database, the system monitor is notified when the Registry Database is updated, and the system monitor alters its operation based on the updates to the Registry Database.

8. The apparatus of claim 1, further comprising a shadow process, executed by a computer, that is connected to the system monitor by a connection to detect when the system monitor terminates abnormally.

9. The apparatus of claim 7, wherein the shadow process restarts the system monitor when the system monitor terminates abnormally.

10. The apparatus of claim 7, wherein the system monitor monitors the shadow process by means of the connection between the system monitor and the shadow process to detect when the shadow process terminates abnormally, and the system monitor restarts the shadow process when the shadow process terminates abnormally.

11. The apparatus of claim 1, wherein the system monitor maintains a list of registered components and their active connections.

12. The apparatus of claim 1, wherein the failure recovery services comprise one or more actions selected from a group comprising: (1) running another process; (2) starting a service; and (3) sending a notification signal.

13. The apparatus of claim 12, wherein the notification signal is one or more signals selected from a group comprising: (1) an email message; (2) a fax; (3) an alphanumeric page; and (4) a global alert.

14. A method of failure recovery, comprising:
(a) registering a component executed by a computer for failure recovery services performed by a system monitor executed by a computer;
(b) monitoring the registered component in the system monitor via a connection between the registered component and the system monitor; and
(c) performing the failure recovery services in the system monitor when the registered component's termination is detected by a closing of the connection.

15. The method of claim 14, wherein the system monitor and registered component are connected on a per-thread basis.

16. The method of claim 15, wherein the registered component is multi-threaded, and the method comprises establishing a separate connection to the system monitor from each of its multiple threads.

17. The method of claim 16, further comprising performing the failure recovery services in the system monitor when a last one of the separate connections with the registered component is closed.

18. The method of claim 14, wherein the connection is selected from a group comprising local connections and remote connections.

19. The method of claim 14 , wherein there exists an inter-process communications path between a Service Control Manager (SCM) and the system monitor, and the SCM provides a user interface used to start, stop, and interrogate the system monitor.

20. The method of claim 14, wherein the system monitor includes a link to a Registry Database, and the method further comprises notifying the system monitor when the Registry Database is updated and altering the system monitor's operation based on the updates to the Registry Database.

21. The method of claim 14, further comprising monitoring the system monitor in a shadow process executed by the computer by means of a connection between the system monitor and the shadow process to detect when the system monitor terminates abnormally.

22. The method of claim 21, further comprising restarting the system monitor from the shadow process when the system monitor terminates abnormally.

23. The method of claim 20, further comprising monitoring the shadow process in the system monitor by means of the connection between the system monitor and the shadow process to detect when the shadow process terminates abnormally, and restarting the shadow process from the system monitor when the shadow process terminates abnormally.

24. The method of claim 14, wherein the system monitor maintains a list of registered components and their active connections.

25. The method of claim 14, wherein the failure recovery services comprise one or more actions selected from a group comprising: (1) running another process; (2) starting a service; and (3) sending a notification signal.

26. The method of claim 25, wherein the notification signal is one or more signals selected from a group comprising: (1) an email message; (2) a fax; (3) an alphanumeric page; and (4) a global alert.

27. A program storage medium readable by a computer and embodying one or more instructions executable by the computer to perform method steps for failure recovery, the method comprising:
 (a) registering a component executed by a computer for failure recovery services performed by a system monitor executed by a computer;
 (b) monitoring the registered component in the system monitor via a connection between the registered component and the system monitor; and
 (c) performing the failure recovery services in the system monitor when the registered component's termination is detected by a closing of the connection.

28. The method of claim 27, wherein the system monitor and registered component are connected on a per-thread basis.

29. The method of claim 28, wherein the registered component is multi-threaded, and the method comprises establishing a separate connection to the system monitor from each of its multiple threads.

30. The method of claim 29, further comprising performing the failure recovery services in the system monitor when a last one of the separate connections with the registered component is closed.

31. The method of claim 27, wherein the connection is selected from a group comprising local connections and remote connections.

32. The method of claim 27, wherein there exists an inter-process communications path between a Service Control Manager (SCM) and the system monitor, and the SCM provides a user interface used to start, stop, and interrogate the system monitor.

33. The method of claim 27, wherein the system monitor includes a link to a Registry Database, and the method further comprises notifying the system monitor when the Registry Database is updated and altering the system monitor's operation based on the updates to the Registry Database.

34. The method of claim 27, further comprising monitoring the system monitor in a shadow process executed by the computer by means of a connection between the system monitor and the shadow process to detect when the system monitor terminates abnormally.

35. The method of claim 34, further comprising restarting the system monitor from the shadow process when the system monitor terminates abnormally.

36. The method of claim 34, further comprising monitoring the shadow process in the system monitor by means of the connection between the system monitor and the shadow process to detect when the shadow process terminates abnormally, and restarting the shadow process from the system monitor when the shadow process terminates abnormally.

37. The method of claim 27, wherein the system monitor maintains a list of registered components and their active connections.

38. The method of claim 27, wherein the failure recovery services comprise one or more actions selected from a group comprising: (1) running another process; (2) starting a service; and (3) sending a notification signal.

39. The method of claim 38, wherein the notification signal is one or more signals selected from a group comprising: (1) an email message; (2) a fax; (3) an alphanumeric page; and (4) a global alert.

* * * * *